Feb. 9, 1960      L. F. SKUBIC      2,924,339
PALLET TIERING AND SUPPORTING MEANS
Filed May 14, 1956      2 Sheets-Sheet 1
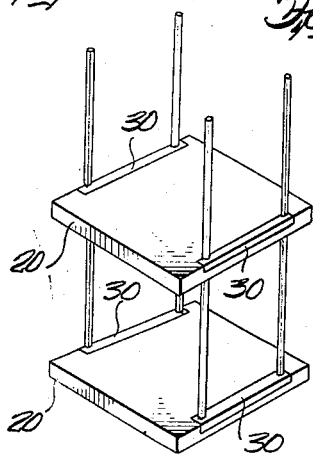
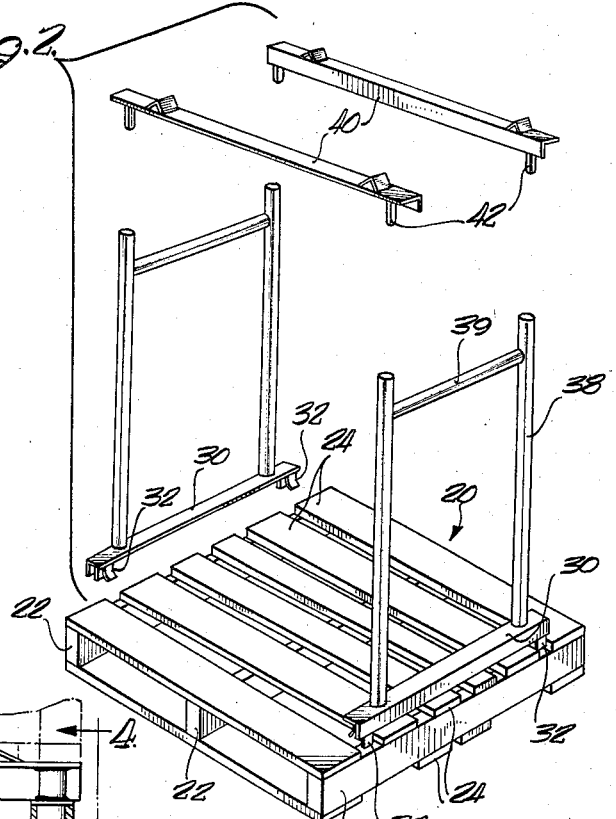
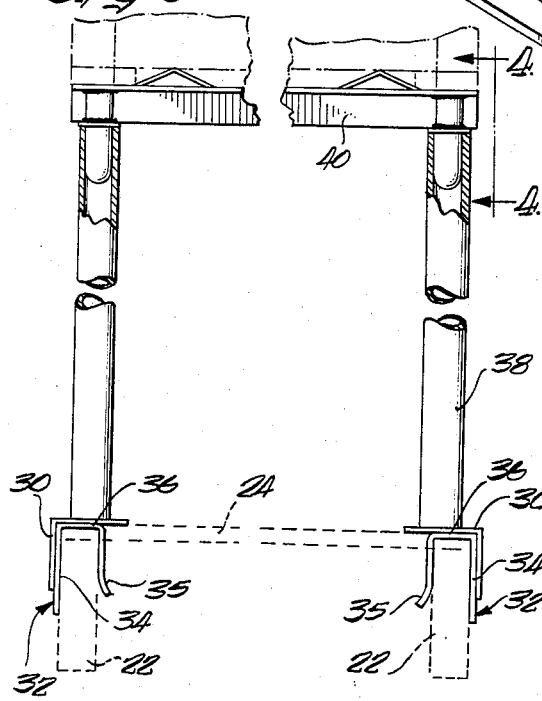
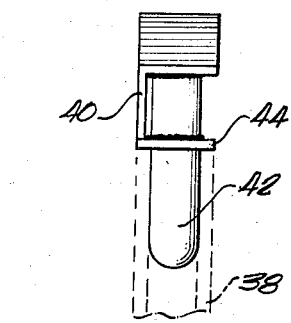
Inventor
Leroy F. Skubic
by Carlson, Pitzner, Hubbard & Wolfe
Attorneys

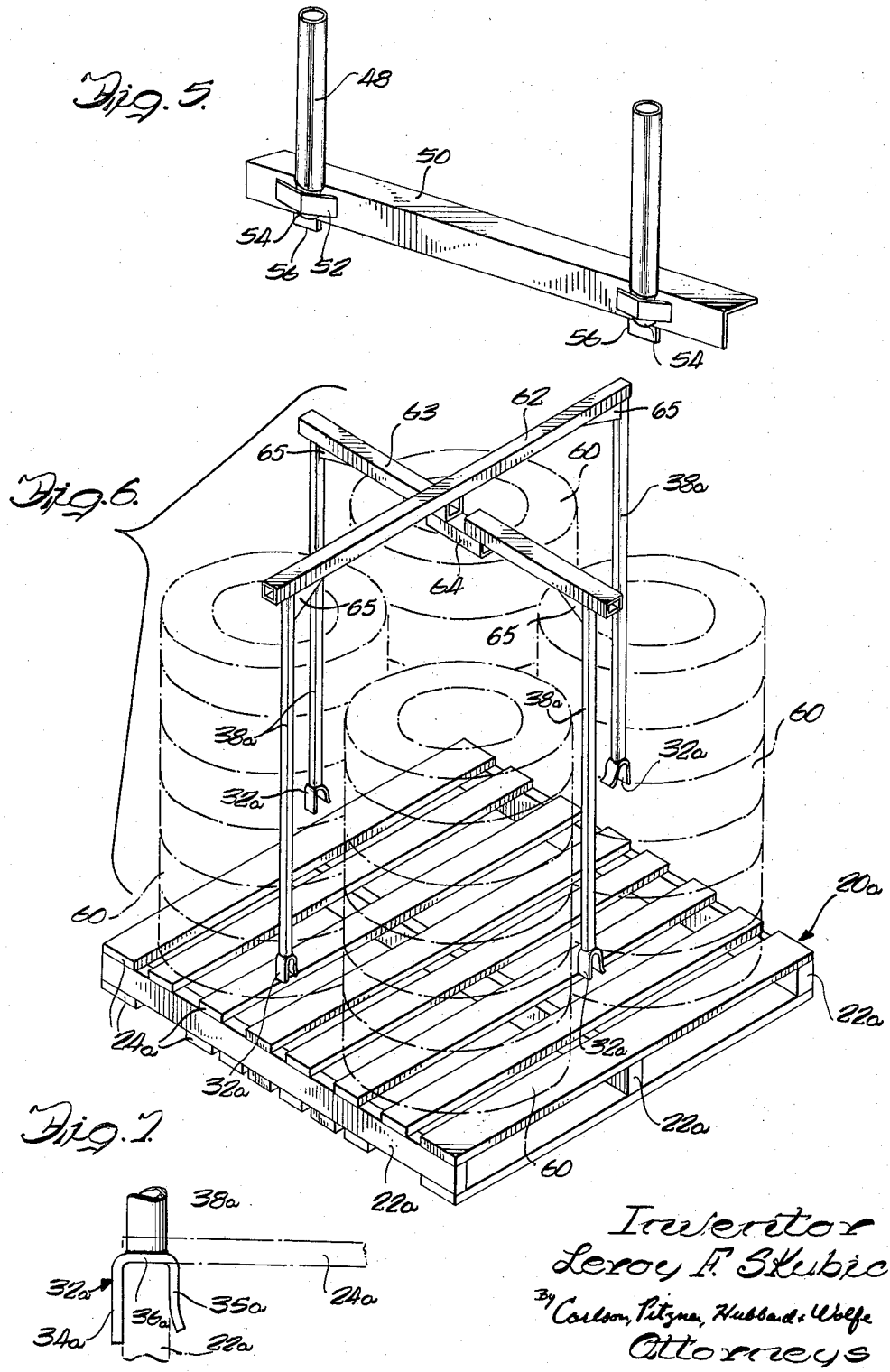

United States Patent Office 2,924,339
Patented Feb. 9, 1960

2,924,339
PALLET TIERING AND SUPPORTING MEANS

Leroy F. Skubic, Beverly Shores, Ind., assignor to The Paltier Corporation, Michigan City, Ind., a corporation of Illinois Application May 14, 1956, Serial No. 584,604

5 Claims. (Cl. 211—148)

The present invention relates to pallets for handling and storing articles. More particularly the invention relates to an improved structure for stacking the pallets in vertical tiers.

Pallets of the type to which this invention relates are commonly used in warehouses and storage areas for stacking loads of merchandise and other articles on successive levels. In many instances, the pallets are shipped with the articles stacked on them from the factory to the customer. At various points enroute, and even at their final destination, the loaded pallets are often times handled and stored in temporary locations. If, as is often the case, racks are not available for stacking the bulky, loaded pallets, they occupy a large floor area causing undesirable congestion in the depot or warehouse.

It is an object of the present invention to provide a pallet tiering structure which is easily mounted on and detachable from a standard commercial pallet without requiring the use of any tools or a special pallet structure.

Another object of the present invention is to provide a versatile, improved securing and supporting arrangement for successively tiered pallets which gives a rigid, reliable and strong tiering structure of a temporary nature.

Still another object of the present invention is to provide a clamping and supporting device for use on a pallet tiering structure and which is easily placed on or removed from commercial wooden pallets and which is strong enough to safely support a heavy load.

Other objects and advantages will become apparent to those skilled in the art as the following description proceeds, taken in connection with the accompanying drawings wherein:

Figure 1 is a perspective view of a plurality of stacked pallets.

Fig. 2 is an exploded perspective view of a commercial pallet and a tiering structure illustrative of the present invention.

Fig. 3 is an elevation view, partly in section, of one illustrative form of the novel pallet tiering structure.

Fig. 4 is an enlarged fragmentary view, taken substantially in the plane of line 4—4 of Fig. 3.

Fig. 5 is a fragmentary perspective view of a modified form of pallet tiering structure for use where a clear pallet deck is required.

Fig. 6 is a perspective view of a modified form of pallet tiering structure for use on a pallet carrying stacked tires or the like.

Fig. 7 is a fragmentary elevation view of the pallet tiering structure clamp shown in Fig. 6.

While the invention is susceptible of various modifications and alternative constructions, certain preferred embodiments have been shown in the drawings and will be described below in detail. It should be understood, however, that there is no intention to limit the invention to the specific form disclosed, but on the contrary, the intention is to cover all modifications alternative constructions and equivalents falling within the spirit and scope of the invention as expressed in the appended claims.

The constructions of a typical pallet in general commercial use can be seen in Fig. 2 of the drawings. Such a pallet, generally designated by the numeral 20, comprises spaced parallel wooden stringers 22 having top and bottom slats 24 disposed in crosswise relation and secured thereon by means of nails, screws or the like. For convenience in describing the invention, the two slatted sides of the pallet are referred to hereinafter as the top and bottom respectively, the extremeties of the pallet between which the stringers 22 extend are referred to as the pallet ends, and the extremeties between which the slats 24 extend are referred to as the sides. In the illustrative pallet shown, the second slat from each end on the bottom is omitted to provide a wheel opening so that the pallet can be lifted by a hand pallet truck.

The removable tiering structure illustrative of the present invention is supported on the pallets 20 by a base 30 having one or more depending hair-pin type clamps 32 for engaging the pallet stringers 22. The base, as shown in Fig. 2, extends along one side of the pallet and has its main supporting face resting on the pallet's upper surface.

The hair-pin clamps 32 project downwardly between the spaced top slats or deck-boards and securely grip the stringers 22. A reliable and secure gripping action is attained by forcing each clamp into tight engagement with a stringer as shown in Fig. 3. The hair-pin clamp 32 itself comprises a pair of opposed stringer engaging fingers 34, 35 connected together at one end by a web 36.

The web 36 connecting the upper ends of the fingers has an inner dimension of sufficient width to allow the clamp to slide as far down on the stringers as possible. This engagement is limited only by the thickness of the top slats 24, as can be seen in Fig. 3, upon which the base 30 rests.

In order to have the fingers securely grip the stringer, at least one of the fingers, 35, is desirably formed of a material having some resiliency. This finger 35 extends downwardly from the web and slightly inwardly towards the other finger 34 so that the clearance between the intermediate portions of the fingers is less than the inner dimensions of the web. This clearance is somewhat less than the thickness of common commercial stringers so that a gripping action is attained by the fingers when the clamp is inserted over the stringer.

Provision is made to ease the insertion of the clamps on to the stringer. This is accomplished by outwardly flaring the lower-most end of one or both of the fingers 34, 35. In the present embodiment, only the inwardly sloping gripping finger 35 is formed with the flared end (Fig. 3). This flared end can be placed adjacent either the inside surface or the outside surface of the stringer.

Although the fingers are spaced apart a distance slightly less than the thickness of most commercial stringers, they are adaptable to a wide variety of stringer thicknesses by virtue of their resiliency. The pallet tiering base is thus suitable for use with commercially constructed pallets which often are made with stringers of varying thicknesses.

The hair-pin clamps 32 just described are attached to the base 30 in any suitable manner, such as by welding one finger and the web to the inner angle of an angle iron base of the type shown in Figs. 2 and 3. It is also possible to secure the web of the clamp to a flat base by welding or other suitable means. When the clamp is so attached to the base, it will hold the base securely on the pallet and prevent it from twisting or slipping thereon. The base 30 is shown in Fig. 2 as an angular strip of metal for the purpose of engaging the side of the pallet as well as the top and to give additional area for attaching the clamps. While this particular construction results in a strong, rigid base for the tiering supports, it will be understood that a separate base can be used with each clamp, if a more versatile structure is desired.

In order to tier successive pallets, one or more upwardly extending posts 38 are securely supported on each base. The posts can be permanently welded to the base, or any suitable temporary mounting can be used. In the form illustrated in Fig. 2, a pair of posts are positioned on opposing sides of the pallet, each pair being welded to a single base provided with the above described clamps. Each pair of posts extends upwardly the desired amount and the pairs are desirably braced by a suitable, horizontal cross-brace 39 adjacent their upper ends.

The pallet tiering structure is completed by cross-bars 40 which extend from side to side between corresponding posts of each pair (Fig. 3). One illustrative means for remotely securing the cross-bars 40 on the posts 38 is shown in Fig. 4. This embodiment, useful where the posts 38 are of a tubular nature, comprises a pin 42 depending from the cross-bar and adapted to be inserted into the upper open end of the tubular post. Because a strong, stable support is desired, the pin 42 is formed with an annular collar 44, which engages the upper annular end of the post. The entire pin 42, collar 44, and cross-bar 40, are welded or otherwise joined together as a strong, rigid unit.

For purposes of alining successively tiered pallets on the cross-bars 40, upstanding angle guides 48 are placed on the upper surfaces of the cross-bars so that they are engaged by the inner edge portions of the stringers of the pallet to be tiered.

For some applications it is desirable to mount the post on the base 30 adjacent its sides rather than on its top. Such a construction is useful, for example, where the posts 38 are removably attached to the base and is particularly suitable where wooden posts are to be used with a metal base. In this modification, illustrated in Fig. 5, the posts 48 are secured to the base 50 by means of an angle strap 52. This strap forms a pocket adapted to receive the tapered end 54 of the post 48. The base 50 is in turn secured to the pallet by suitable spring clips 56 which are similar to those described above.

A further modified form of pallet tiering structure is shown in Fig. 6. This modification is particularly useful when the pallet is loaded with stacks of tires or similarly shaped articles which obstruct a substantial portion of the edges of the pallet sides and ends. Such an obstruction precludes the use of the above described clamp structure in which the base is mounted on one end of the pallet and extends a distance along its top and side adjacent to that edge. In describing this modification, reference characters corresponding to those above will be used with the distinguishing suffix "a".

When tires, for example, are to be palletized, four stacks are generally placed on a single pallet. Each stack 60, as can be seen in Fig. 6, occupies nearly all of one corner of a pallet 20a. This leaves only small, substantially triangular areas on the top of the pallet 20a between the stacks 60 and midway between the pallet's ends and sides. Most commercial pallets are constructed in a manner such that a stringer 22a is exposed between the slats 24a covering these areas.

The pallet tiering structure exemplified in Fig. 6 takes advantage of these exposed stringers by using them as supports. This is accomplished by the provision of vertical posts 38a secured to these stringers by means of clamps 32a. Each post is rigidly secured to the web 36a of the clamp so that the clamp fingers 34a and 35a (Fig. 7) extend downwardly from the post 38a so as to grip the stringers 22a. In order to securely engage the stringers, at least one of the fingers 35a depends downwardly and slightly inwardly from the web so that it exerts a force on the side of an inserted stringer. As previously described, the lower ends of the fingers are desirably flared to guide and ease the placement of the clamp on the stringer. The pallet tiering structure of this modification is completed by fixing a cross-bar 62 to the upper ends of the posts on opposite sides of the pallet and by fixing a second cross-bar 63 to the upper ends of the post at opposite ends of the pallet. For purposes of strengthening the structure, rigidifying braces 65 are secured between the posts 38a and their respective cross-bars 62 and 63.

In order to have a flat pallet tiering surface on the structure thus formed, one of the cross-bars, for example the cross-bar 63 extending between the pallet ends, includes a recessed portion 64 intermediate its ends. This recessed portion accommodates the other cross-bar 62 extending crosswise thereto. As a result, a flat upper supporting platform is formed which will accommodate a successively tiered pallet.

The hair-pin clamps 32 and 32a described above are easily snapped over the pallet stringers. This is done by placing the flared finger 35 against one side of the stringer to be gripped and holding the posts 38 at an acute angle to the vertical with the other finger engaging the upper marginal edge of the opposite side of the stringer. The clamps are then pushed toward the stringer causing the fingers to spread apart and simultaneously the posts are moved toward their vertical position. The stringer wedges the fingers apart and the clamp is easily snapped downwardly into place. With the posts in a vertical position, the cross-bars are mounted in place on their upper ends and the structure is ready to receive and support another pallet.

The pallet tiering structure described is thus seen to be easily mountable or detachable from a conventional commercial pallet and giving, when in use, a reliable and strong tiering structure which will safely support a heavy load. The novel structure, while being of a temporary nature, gives an unusually secure and rigid box-like structure which is adaptable for assembly without the use of special tools or pallet hardware. The use of such a pallet structure saves considerable expense and wasted space in locations where a more permanent type of structure is found to be unwieldly.

I claim as my invention:

1. In a load carrying superstructure mountable on a supporting pallet for vertically tiering a plurality of similar pallets thereon, each pallet having longitudinal stringers and spaced deckboards secured transversely on the stringers, the combination comprising a pair of pallet supporting cross members disposed in laterally spaced parallel relation with each other, two pairs of vertical support posts, each pair of posts being permanently and rigidly connected together so as to define a structural frame, a pair of connecting elements rigidly fixed on each of said cross members and detachably engaged with respective ones of the posts in each structural frame, said connecting elements when engaged with said posts maintaining said structural frames in rigid spaced relation corresponding substantially to the spacing of the outermost stringers of an underlying supporting pallet, bearing means attached to the lower end of each post and supported on the supporting pallet for transmitting the load of said superstructure thereto, and anchor means fixed to said bearing means projecting downwardly between spaced deckboards and detachably engaging the outermost stringers of the supporting pallet and positioning said structural frames in substantially vertical alinement with the respective outermost stringers thereof, said anchor means comprising a pair of spaced fingers connected at their upper ends by a web and extending downwardly and inwardly towards each other, at least one of said fingers having an outwardly flared lower end portion for facilitating engagement of the stringer by said anchor means, said fingers straddling and gripping said stringer when said bearing member is supported on the pallet for holding the structural frame thereon when a successive pallet is placed in vertical tiered relation on said cross members.

2. In a load carrying superstructure mountable on a supporting pallet for vertically tiering a plurality of similar pallets thereon, each pallet having longitudinal stringers and spaced deckboards secured transversely on the stringers, the combination comprising a pair of pallet supporting cross members disposed in laterally spaced parallel relation with each other, two pairs of vertical support posts, each pair of posts being permanently and rigidly connected together adjacent their upper ends, an elongated plate-like bearing means permanently and rigidly connected to each pair of posts at their lower ends and supported on an underlying supporting pallet for transmitting the load of said superstructure thereto, each pair of connected posts defining a rigid structural frame, a pair of connecting elements rigidly fixed on each of said cross members and detachably engaged with respective ones of the posts in each structural frame, said connecting elements when engaged with said posts maintaining said structural frames in rigid spaced relation corresponding substantially to the spacing of the outermost stringers of the supporting pallet, and anchor means fixed to said bearing means projecting downwardly between spaced deckboards and detachably engaging the outermost stringers of the supporting pallet and positioning said structural frames in substantially vertical alinement with the respective outermost stringers thereof, said anchor means comprising a pair of spaced fingers connected at their upper ends by a web and extending downwardly and inwardly towards each other, at least one of said fingers having an outwardly flared lower end portion for facilitating engagement of the stringer by said anchor means, said fingers straddling and gripping said stringer when said bearing member is supported on the pallet for holding the structural frame thereon when a successive pallet is placed in vertical tiered relation on said cross members.

3. In a load carrying superstructure mounted on a supporting pallet for vertically tiering a plurality of similar pallets thereon, each pallet having longitudinal stringers and spaced deckboards secured transversely on the stringers, the combination comprising, a pair of pallet supporting cross members disposed in laterally spaced parallel relation with each other, two pairs of vertical support posts, means permanently and rigidly connecting the posts of each pair together intermediate their ends so as to define a structural frame, a pair of connecting elements rigidly fixed on each of said cross members and detachably engaged with respective ones of the posts in each structural frame, said cross members and connecting elements maintaining said structural frames in rigid spaced relation corresponding substantially to the spacing of the outermost stringers of the underlying supporting pallet, angle shaped bearing means attached between the lower ends of each pair of posts of each structural frame, one leg of said angle being supported on the supporting pallet for transmitting the load of the superstructure thereto and the other leg depending alongside the adjacent outermost stringer, and anchor means engaged with said bearing means projecting downwardly between spaced deckboards and detachably engaging the adjacent outermost stringer of a supporting pallet for preventing said bearing means and superstructure from slipping off of the supporting pallet.

4. In a load carrying superstructure mounted on a supporting pallet for vertically tiering a plurality of similar pallets thereon, each pallet having longitudinal stringers and spaced deckboards secured transversely on the stringers, the combination comprising, a pair of pallet supporting cross members disposed in laterally spaced parallel relation with each other, two pairs of vertical support posts, means permanently and rigidly connecting the posts of each pair together so as to define a structural frame, a pair of connecting elements rigidly fixed on each of said cross members and detachably engaged with the upper ends of respective ones of the posts in each structural frame, said cross members and connecting elements maintaining said structural frames in rigid spaced relation corresponding substantially to the spacing of the outermost stringers of an underlying supporting pallet, angle shaped bearing means attached between the lower ends of each pair of posts of each structural frame, one leg of said angle being supported on the supporting pallet for transmitting the load of said superstructure thereto, and the other leg depending alongside the adjacent outermost stringer, and anchor means engaged with said bearing means and detachably engaging the outermost stringers of the supporting pallet, said anchor means comprising a pair of spaced fingers connected at their upper ends by a web and extending downwardly and inwardly towards each other, said fingers straddling and gripping said stringer when said bearing member is supported on the pallet for holding the structural frame thereon when a successive pallet is placed in vertical tiered relation on said cross members.

5. In a load carrying superstructure mounted on a supporting pallet for vertically tiering a plurality of similar pallets thereon, each pallet having longitudinal stringers and spaced deckboards secured transversely on the stringers, the combination comprising, a pair of pallet supporting cross members disposed in laterally spaced parallel relation with each other, two pairs of vertical support posts, means permanently and rigidly connecting the posts of each pair together intermediate their ends so as to define a structural frame, a pair of connecting elements rigidly fixed on each of said cross members and detachably engaged with respective ones of the posts in each structural frame, said cross members and connecting elements maintaining said structural frames in rigid spaced relation corresponding substantially to the spacing of the outermost stringers of the underlying supporting pallet, angle shaped bearing means attached to the lower end of each post of each structural frame, one leg of said angle being supporting on the supporting pallet for transmitting the load of the superstructure thereto and the other leg depending alongside the adjacent outermost stringer, and anchor means engaged with said bearing means projecting downwardly between spaced deckboards and detachably engaging the adjacent outermost stringer of a supporting pallet for preventing said bearing means and superstructure from slipping off of the supporting pallet.

References Cited in the file of this patent

UNITED STATES PATENTS

| | | |
|---|---|---|
| 889,600 | Graumuller et al. | June 2, 1908 |
| 1,727,609 | Kramer | Sept. 10, 1929 |
| 2,443,684 | Lazarus | June 22, 1948 |
| 2,495,711 | Fletcher | Jan. 31, 1950 |
| 2,579,685 | Loose | Dec. 25, 1951 |
| 2,623,641 | Shield | Dec. 30, 1952 |
| 2,700,520 | Skubic | Jan. 25, 1955 |
| 2,744,634 | Conley | May 8, 1956 |

FOREIGN PATENTS

| | | |
|---|---|---|
| 1,070,723 | France | Feb. 24, 1954 |